United States Patent
Cun

(10) Patent No.: US 12,043,243 B1
(45) Date of Patent: Jul. 23, 2024

(54) FUNCTION REDUCING SYSTEM WITHIN AN ELECTRIC VEHICLE TO PRESERVE POWER CONSUMPTION AND METHODS THEREOF

(71) Applicant: Honda Motor Co., Ltd., Tokyo (JP)

(72) Inventor: David Wong Cun, Fountain Valley, CA (US)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 18/298,861

(22) Filed: Apr. 11, 2023

(51) Int. Cl.
| | |
|---|---|
| *B60W 10/30* | (2006.01) |
| *B60H 1/00* | (2006.01) |
| *B60R 21/015* | (2006.01) |
| *B60L 53/60* | (2019.01) |
| *B60N 2/00* | (2006.01) |

(52) U.S. Cl.
CPC ......... *B60W 10/30* (2013.01); *B60H 1/00742* (2013.01); *B60R 21/01512* (2014.10); *B60L 53/60* (2019.02); *B60N 2/002* (2013.01)

(58) Field of Classification Search
CPC ............ B60W 10/30; B60R 21/01512; B60R 21/015; B60H 1/00742; B60H 1/00; B60L 53/60; B60N 2/002; B60N 2/00
See application file for complete search history.

(56) References Cited

U.S. PATENT DOCUMENTS

| | | |
|---|---|---|
| 8,768,561 B2 | 7/2014 | Smith et al. |
| 9,308,911 B2 | 4/2016 | Kohlberger et al. |
| 9,335,179 B2 | 5/2016 | Penilla et al. |
| 9,676,283 B2 | 6/2017 | Jackson et al. |
| 9,701,200 B2 | 7/2017 | Dhillon et al. |
| 10,286,807 B2 | 5/2019 | Christen et al. |
| 10,300,808 B2 | 5/2019 | Newman et al. |
| 10,744,885 B2 | 8/2020 | Jammoul et al. |
| 10,770,815 B2 | 9/2020 | Farber |
| 2018/0105051 A1 | 4/2018 | Zheng et al. |
| 2019/0248241 A1 | 8/2019 | Badger, II et al. |
| 2020/0215924 A1 | 7/2020 | Kamen et al. |
| 2023/0039878 A1 | 2/2023 | Penilla et al. |

FOREIGN PATENT DOCUMENTS

| | | |
|---|---|---|
| JP | 7012039 B2 | 4/2018 |
| JP | 6620419 B2 | 12/2019 |

*Primary Examiner* — Robert L Deberadinis
(74) *Attorney, Agent, or Firm* — Aaron Fong; American Honda Motor Co., Inc.

(57) ABSTRACT

The present disclosure relates to an electric vehicle and more particularly, to a system for reducing charging time of the electric vehicle when an occupant decides to wait in their vehicle while their vehicle is charging. In one illustrative embodiment, a vehicle system within the electric vehicle may determine whether the electric vehicle is charging. The vehicle system may then determine whether an occupant is within the electric vehicle. This may be performed through a number of systems such as an in-vehicle camera or seat sensor. At least one function may be reduced or removed when an occupant has been detected thus making their stay uncomfortable. Sound, for example, may be reduced while the occupant is detected in the vehicle and the vehicle is charging. Similarly, heating, ventilation, and air conditioning functions may be removed.

20 Claims, 9 Drawing Sheets

FUNCTION REDUCING SYSTEM WITHIN AN ELECTRIC VEHICLE TO PRESERVE POWER CONSUMPTION AND METHODS THEREOF

BACKGROUND

Electric vehicles may include a traction battery that stores electricity to power the electric vehicle. The traction battery may be replenished periodically by using, for example, charging equipment installed at a residential home or charging equipment installed at a charging station. Due to the time it takes to charge the vehicle, which may last 45 minutes, an occupant within the vehicle may read a book, watch videos, play video games, or the like to remove boredom.

Unfortunately, this may lead to power drain within the vehicle. The occupant may draw power from the charging equipment when they use power to activate their devices within the vehicle. This may extend a charging time of the vehicle as the amount of the power is not fully directed towards replenishing the charge in the battery.

The present disclosure provides for a function reducing system within an electric vehicle to preserve power consumption and method thereof that overcomes the aforementioned challenges. Other benefits and advantages will become clear from the disclosure provided herein and those advantages provided are for illustrative purposes only. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a system for reducing charging time of an electric vehicle is provided. The system may include a memory storing one or more instructions and a processor executing one or more of the instructions stored on the memory to perform a number of processes. The processes may include determining whether an occupant is within the electric vehicle and reducing or removing at least one function within the electric vehicle when the electric vehicle is charging and the occupant is within the electric vehicle.

In accordance with another aspect of the present disclosure, a computer program product having a non-transitory computer useable storage medium to store a computer readable program is provided. The computer readable program, when executed on a computer, causes the computer to perform operations. The operations may include determining whether an occupant is within the electric vehicle and removing functions within the electric vehicle based on time when the electric vehicle is charging and the occupant is within the electric vehicle.

In accordance with yet another aspect of present disclosure, an electric vehicle is provided. The electric vehicle may include a traction battery, a memory storing one or more instructions, and a processor executing one or more of the instructions stored on the memory to perform a number of processes. The processes may include charging of the traction battery, monitoring whether an occupant is within the electric vehicle, and reducing or removing at least one function within the electric vehicle when the occupant is within the electric vehicle.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

Figure 1:
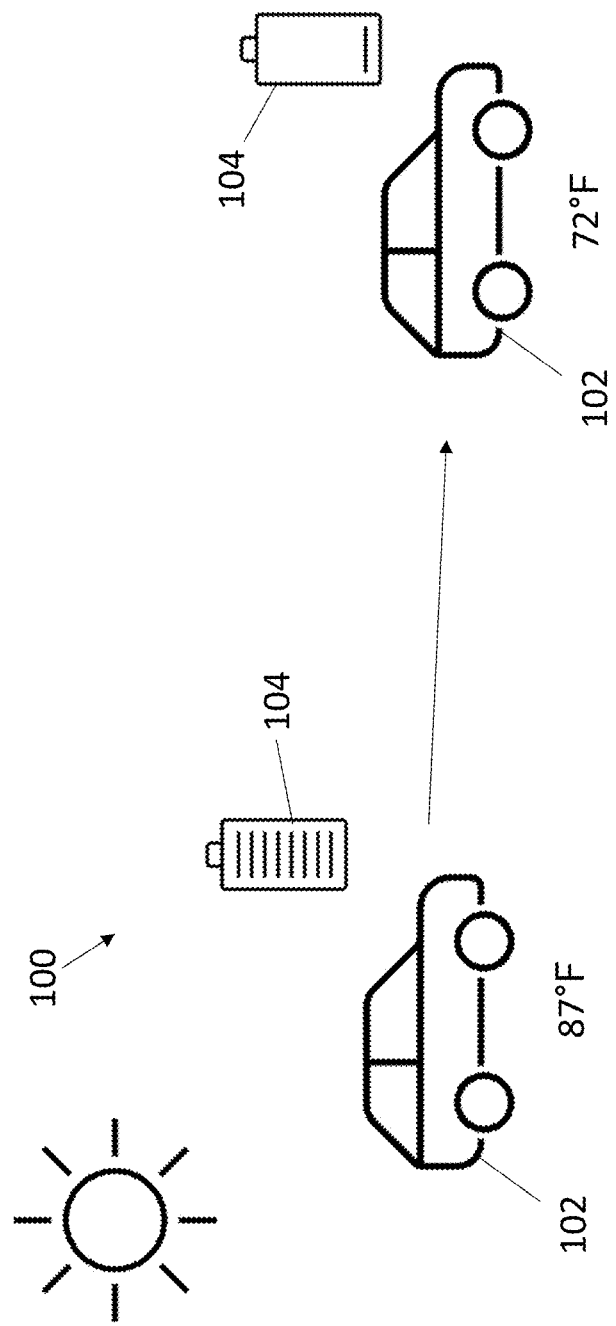
FIG. 1 is a schematic diagram of an illustrative environment whereby an electric vehicle's cabin is pre-cooled for passenger comfort in accordance with one aspect of the present disclosure.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to an electric vehicle and more particularly, to a system for reducing charging time of the electric vehicle when an occupant decides to wait in their vehicle while their vehicle is charging. In one illustrative embodiment, a vehicle system within the electric vehicle may determine whether the electric vehicle is charging. The vehicle system may then determine whether an occupant is within the electric vehicle. This may be performed through a number of systems such as an in-vehicle camera or seat sensor. At least one function may be reduced or removed when an occupant has been detected thus making their stay uncomfortable. Sound, for example, may be reduced while the occupant is detected in the vehicle and the vehicle is charging. Similarly, heating, ventilation, and air conditioning (HVAC) functions may be removed.

Numerous other modifications or configurations to the vehicle system and method thereof will become apparent from the description provided below. For example, while the sound was reduced other functions within the vehicle may be reduced or removed such as lighting. Advantageously, the reduction or removal of the functions within the vehicle may decrease charge being diverted from a traction battery of the electric vehicle, and reduce the amount of time it takes to charge the electric vehicle.

Turning to FIG. 1, a schematic diagram of an illustrative environment 100 whereby an electric vehicle's cabin is pre-cooled for passenger comfort in accordance with one aspect of the present disclosure is provided. This environment 100 shows the initial stages of a vehicle coming in for a charge whereby power from the vehicle's battery 104 is used to cool down its cabin. Initially, a vehicle's temperature may be inline with its environment, for example, 87° F. The occupant within the vehicle 102 may wish to be comfortable while waiting for charge so they decrease the temperature to 72° F. During this time, however, the battery 104 of the vehicle 102 goes from full charged to depleted. Pre-cooling the vehicle 102 takes considerable amounts of energy from the vehicle 102. The battery 104 is drained and when the vehicle 102 pulls into the charging station, more time for charging the vehicle 102 may be required.

Figure 2:
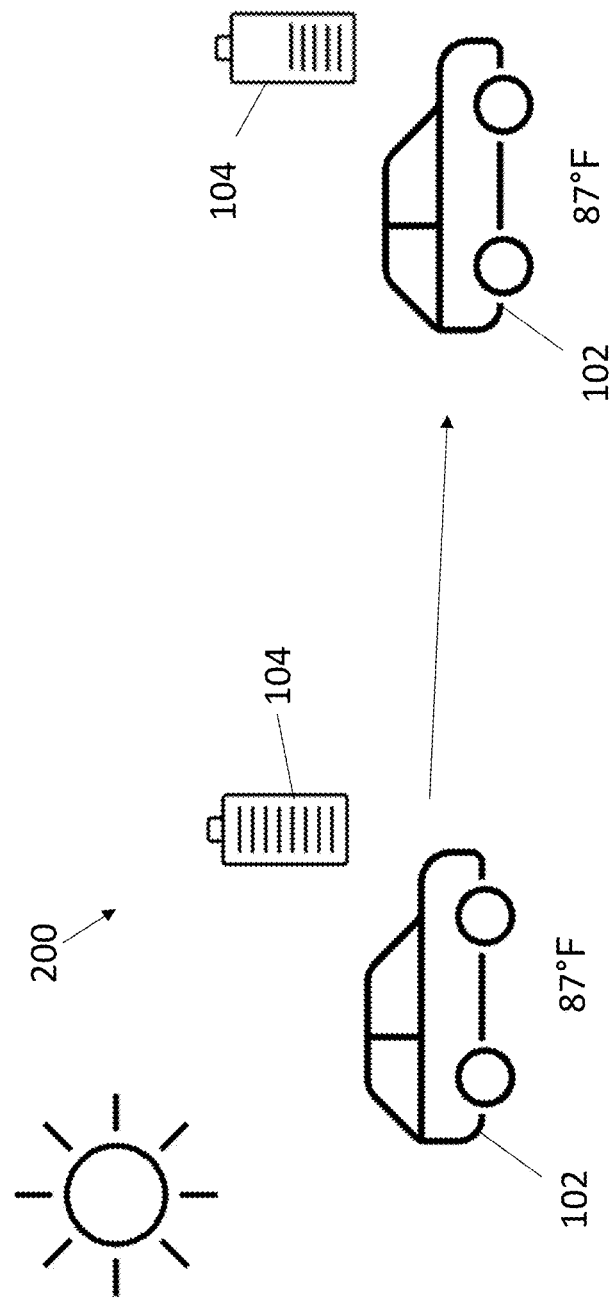
FIG. 2 is a schematic diagram of another illustrative environment whereby an electric vehicle's cabin is not pre-cooled in accordance with one aspect of the present disclosure.

FIG. 2 is a schematic diagram of another illustrative environment 200 whereby an electric vehicle's cabin is not pre-cooled in accordance with one aspect of the present disclosure. The occupant within the vehicle 102 may be trying to conserve power within the battery 104. By reducing the amount of power being used by the vehicle 102, the drain on the battery 104 is less. However, this makes for an uncomfortable situation while the user is waiting for a charge.

Figure 3:
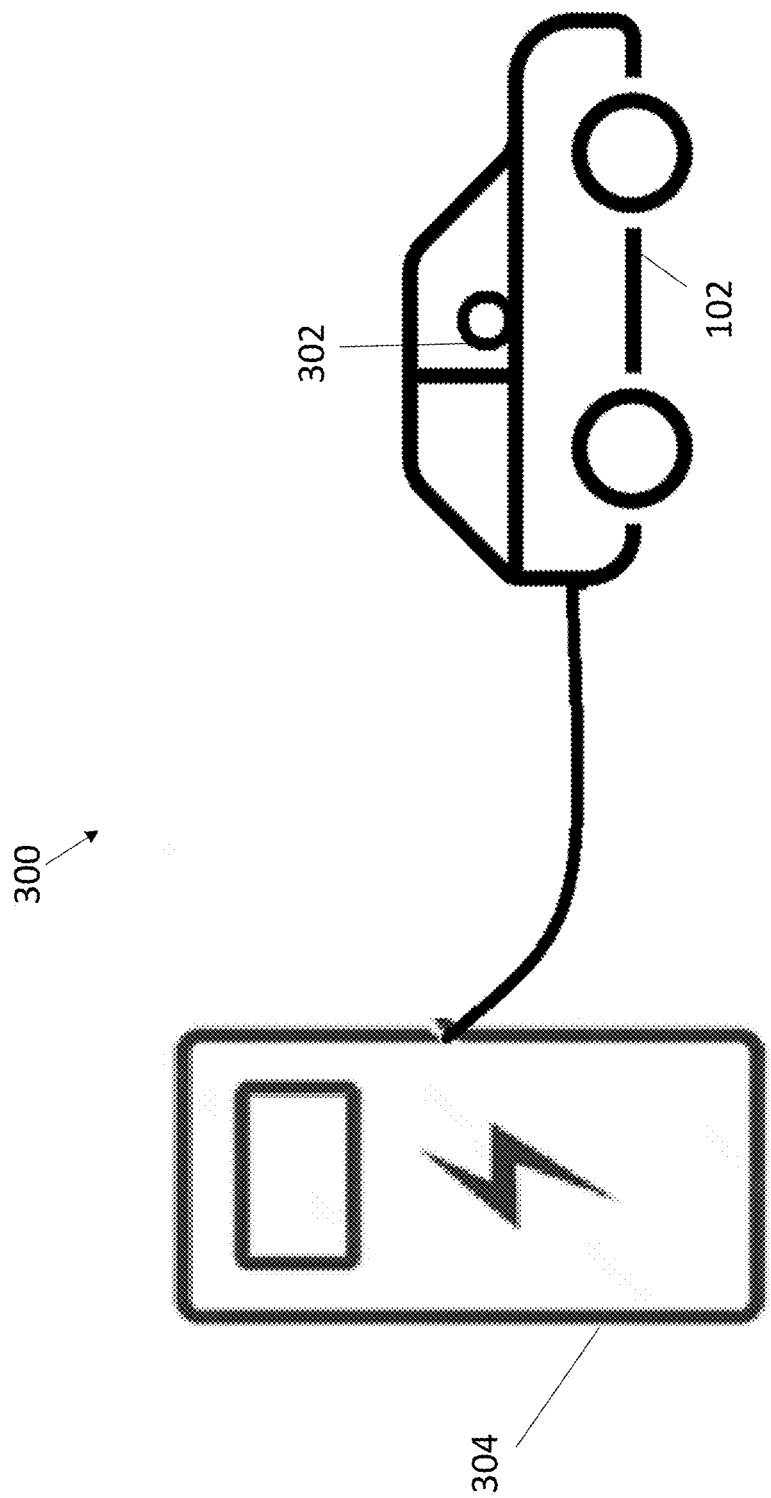
FIG. 3 is a schematic diagram of an illustrative environment whereby an occupant within the electric vehicle has decided to stay within it while the vehicle charges in accordance with one aspect of the present disclosure.

In both scenarios, power management was shown to be important for keeping the occupant comfortable. Depending on how much the cabin was pre-cooled, additional charging time may be needed. FIG. 3 is a schematic diagram of an illustrative environment 300 whereby an occupant 302 within the electric vehicle 102 has decided to stay within it while the vehicle 102 charges in accordance with one aspect of the present disclosure. Unfortunately, when the occupant 302 decides to stay within the vehicle 102, they draw power from the charging station 304 meaning that less power will go directly to the traction battery in the vehicle 102. As will be provided below, by cueing the occupant 302 to vacate the vehicle 102, power may be more fully directed to charge the traction battery of the vehicle 102 and thus reducing the charge time for the vehicle 102. This cueing is used to make the vehicle 102 less comfortable by removing functions or features available to the occupants.

Figure 4:
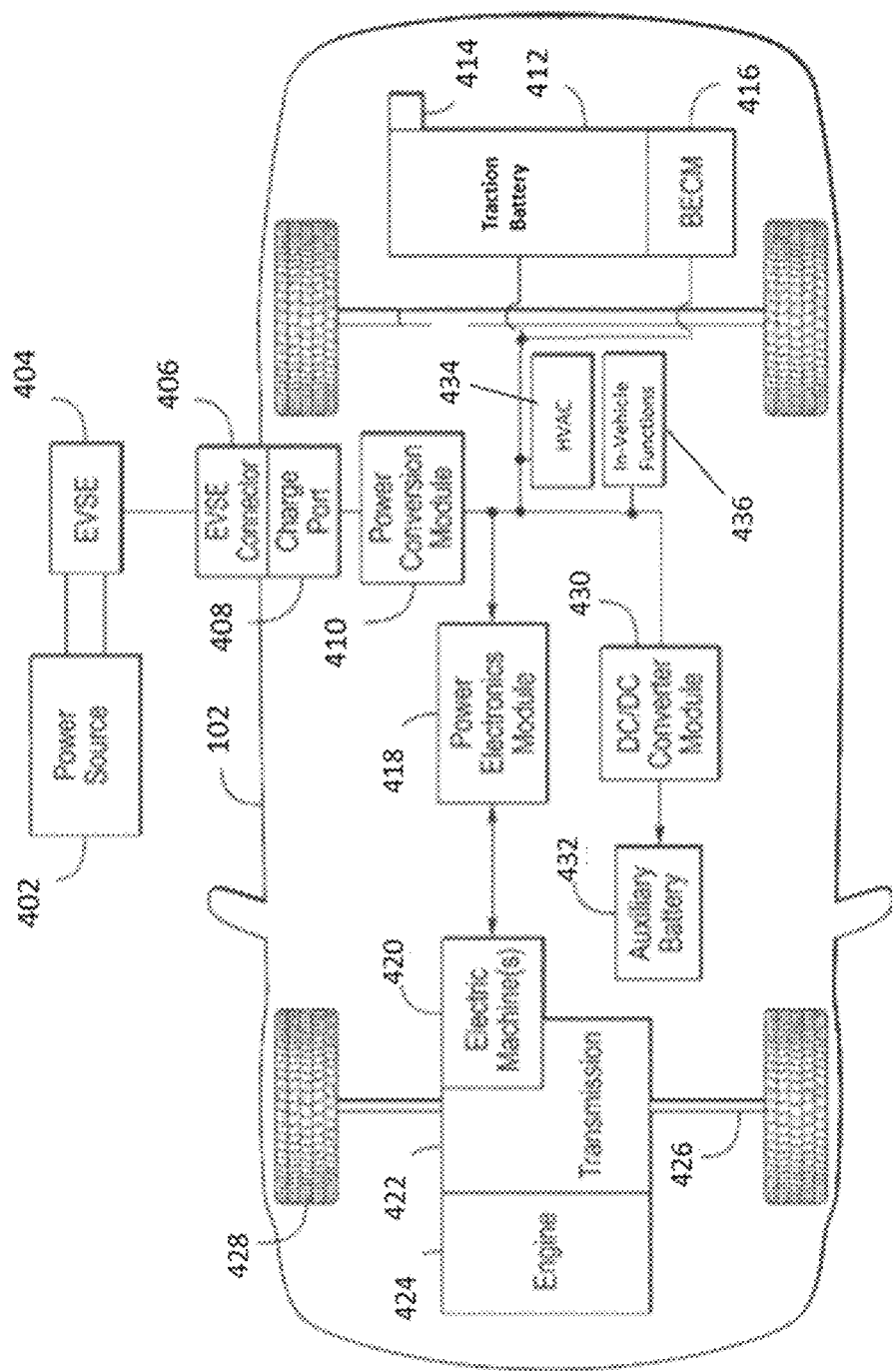
FIG. 4 is a schematic diagram of illustrative components within the electric vehicle for charging and providing features for the occupant in accordance with one aspect of the present disclosure.

Referring to FIG. 4, a schematic diagram of illustrative components within the electric vehicle 102 for charging and providing features for the occupant in accordance with one aspect of the present disclosure is provided. The vehicle 102 may be recharged by an external power source 402. The external power source 402 may be an electric power grid. The external power source 402 may be electrically connected to electric vehicle supply equipment (EVSE) 404. The EVSE 404 may provide circuitry and controls to regulate and manage the transfer of electrical energy between the power source 402 and the vehicle 102.

The external power source 402 may provide DC or AC electric power to the EVSE 404. The EVSE 404 may have a charge connector 406 for plugging into a charge port 408 of the vehicle 102. The charge port 408 may be any type of port configured to transfer power from the EVSE 404 to the vehicle 102. The charge port 408 may be electrically connected to a charger or on-board power conversion module 410. The power conversion module 410 may condition the power supplied from the EVSE 404 to provide the proper voltage and current levels to the traction battery 412. The power conversion module 410 may interface with the EVSE 404 to coordinate the delivery of power to the vehicle 102. The EVSE connector 406 may have pins that mate with corresponding recesses of the charge port 408. In some embodiments, the vehicle 102 may be wirelessly charged via an induction charging system.

The vehicle 102 may have a plurality of different charging modes depending upon the type and power capacity of the EVSE 404. For example, the vehicle 102 may have a slow-charging mode that is used when the EVSE 404 is a 110 volts power source. The vehicle 102 may have another charging mode that is used when the EVSE 404 is a 220 volts power source. The vehicle 102 may also have a fast-charging mode that is used when the power source is a 300 plus volts power source.

The EVSE 404 may be capable of preforming fast charge. The fast-charging mode may be a DC charging mode. The higher-voltage charging modes allow the vehicle 102 to be charged faster because a higher amount of current is being supplied to the battery cells. Because of the higher current, more heat is produced during the higher voltage charging modes. In some of the charging modes, such as fast charge, the batteries must be actively cooled to prevent overheating.

A battery energy control module (BECM) 416 may be in communication with the traction battery 412. The BECM 416 may act as a controller for the traction battery 412 and may also include an electronic monitoring system that manages temperature and charge state of each of the battery cells. The traction battery 412 may have a temperature sensor 414 such as a thermistor or other temperature gauge. The temperature sensor 414 may be in communication with the BECM 416 to provide temperature data regarding the traction battery 412.

The traction battery 412 may be electrically connected to one or more power electronics modules 418 through one or more contactors (not shown). The one or more contactors isolate the traction battery 412 from other components when opened and connect the traction battery 412 to other components when closed. The power electronics module 418 may be electrically connected to the electric machines 420 and may provide the ability to bi-directionally transfer electrical energy between the traction battery 412 and the electric machines 420. For example, a typical traction battery 412 may provide a DC voltage while the electric machines 420 may require a three-phase alternating current (AC) voltage to function. The power electronics module 418 may convert the DC voltage to a three-phase AC voltage as required by the electric machines 420.

In a regenerative mode, the power electronics module 418 may convert the three-phase AC voltage from the electric machines 420 acting as generators to the DC voltage required by the traction battery 412. The description herein is equally applicable to a fully-electric vehicle 102. In a fully-electric vehicle 102, the hybrid transmission 422 may be a gear box connected to an electric machine 420 and the engine 424 is not present. The transmission 422 may also be mechanically connected to a drive shaft 426 that is mechanically connected to the wheels 428.

In addition to providing energy for propulsion, the traction battery 412 may provide energy for other vehicle electrical systems. A typical system may include a DC/DC converter module 430 that converts the high voltage DC output of the traction battery 412 to a low voltage DC supply that is compatible with other vehicle components. Other high-voltage loads, such as compressors and HVAC systems 434, may be connected directly to the high-voltage supply without the use of a DC/DC converter module 430. In a typical vehicle, the low-voltage systems are electrically connected to an auxiliary battery 432 (e.g., a 12 volt battery). Other in-vehicle functions 436 and features within the vehicle 102 may be implemented. For example, lighting systems, entertainment systems, and the like. Some entertainment systems may include movie players, streaming services that require a transmission control unit (TCU), and other high power consuming services. These may be used to keep the occupants entertained and provide some comfort while the occupant(s) is waiting within the vehicle to charge their vehicle. These devices may take power thereby increasing the amount of time the occupants wait within the vehicle 102 and charges.

Figure 5:
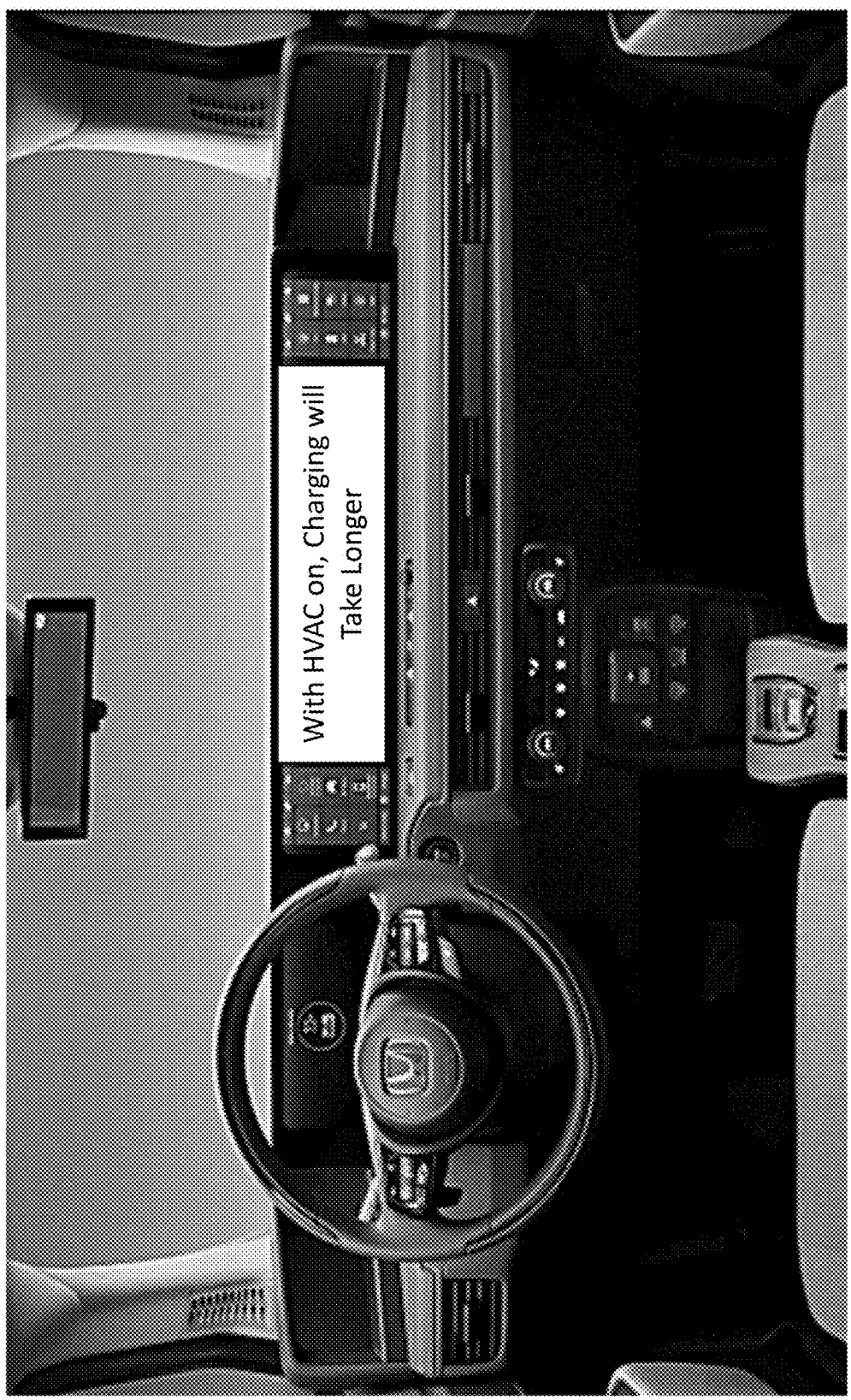
FIG. 5 is a schematic diagram of an illustrative vehicle display warning that charging will take longer when the occupant is within the vehicle in accordance with one aspect of the present disclosure.

FIG. 5 is a schematic diagram of an illustrative vehicle display warning that charging will take longer when the occupant is within the vehicle in accordance with one aspect of the present disclosure. In this environment 500, the occupants may turn on the HVAC system which is a large consumer of power. The consumption may be quite large and may drain power that would have otherwise went to the charging of the traction battery. More power is consumed by the HVAC system when there is a large temperature differential between the ambient air and the temperature inside the vehicle.

Figure 6:
FIG. 6 is a schematic diagram of another illustrative vehicle display warning that charging will take longer when the occupant is within the vehicle in accordance with one aspect of the present disclosure.

FIG. 6 is a schematic diagram of another illustrative vehicle display warning that charging will take longer when the occupant is within the vehicle in accordance with one aspect of the present disclosure. In this environment 600, the occupant may be using an entertainment system within the vehicle while they are waiting for their vehicle to charge. The entertainment system may include watching movies, video games, or the like within the vehicle. A variety of systems may be used within the vehicle including the instrument cluster, the center console, and the like. Entertainment systems in the back of the vehicle may also consume power. Each may result in extending the charging time of the vehicle as power is diverted to these systems.

The examples showing power drain above are for illustrative purposes and should not be construed as limiting. The systems within the vehicle may take a large amount of power and thus may affect the entire charging time. When power is taken for other purposes beyond charging the traction battery, the charging time may be increased. The system for reducing charging time of the electric vehicle when an occupant decides to wait in their vehicle while their vehicle is charging is described herein.

Figure 7:
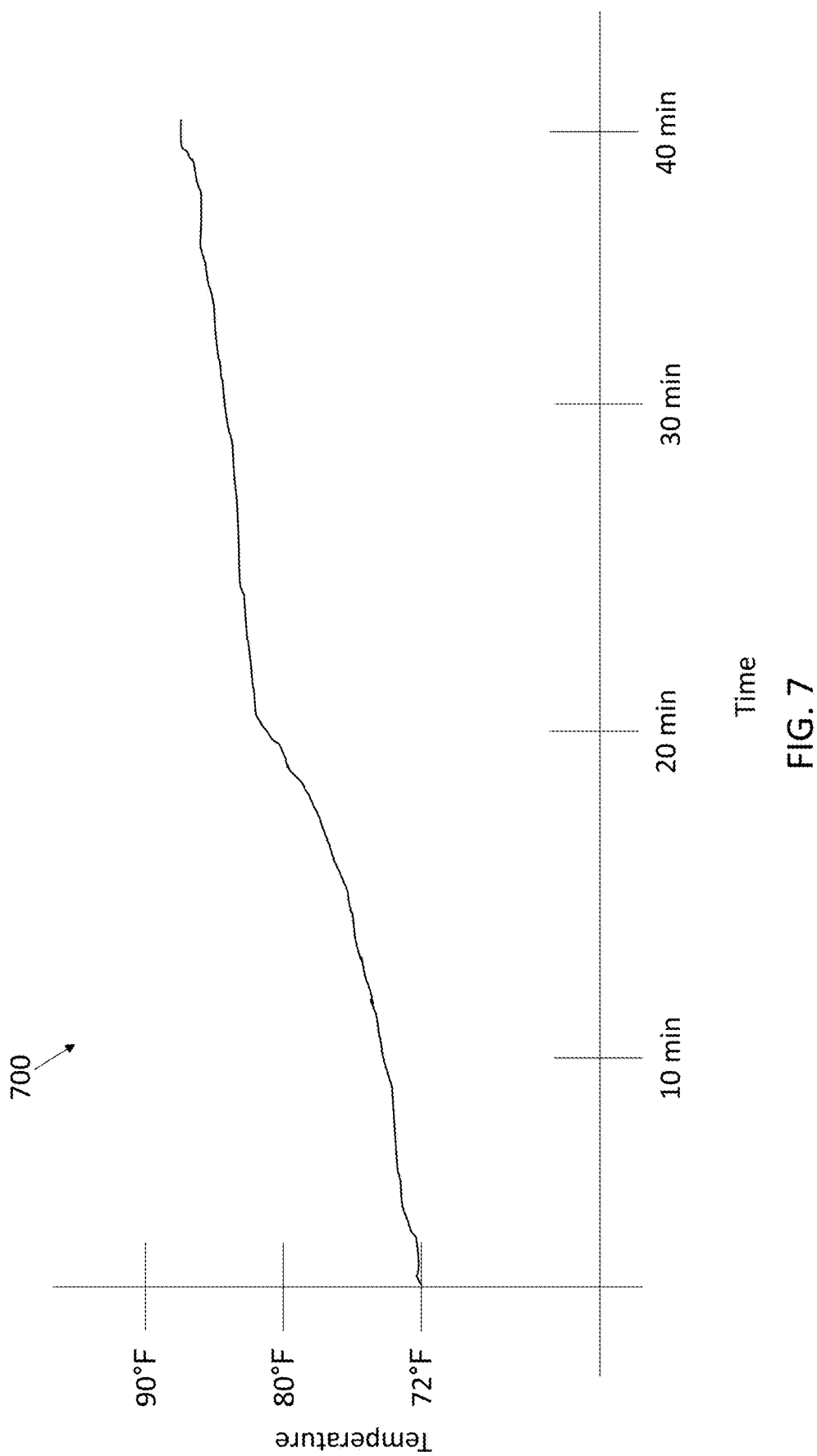
FIG. 7 is a diagram of an illustrative time sequence showing the removal of a HVAC system such that a temperature within the vehicle is increased in order to convince the occupant to exit the vehicle in accordance with one aspect of the present disclosure.

Now referring to FIG. 7, a diagram of an illustrative time sequence 700 showing the removal of a HVAC system such that a temperature within the vehicle is increased in order to convince the occupant to exit the vehicle in accordance with one aspect of the present disclosure is provided. By removing HVAC functions, the occupants would be less likely to stay in the vehicle. In this way, a vehicle system is automatically adjusted to convince the occupants to leave the vehicle. By convincing the occupants to leave the vehicle subtly, the traction battery of the vehicle may be charged quicker than with the vehicle systems consuming power.

The provided sequence 700 may be used in one illustrative example. In the first couple of minutes, for example 10 to 20 minutes, the HVAC system may be turned off. The temperature within the vehicle may increase such that the interior of the vehicle would be uncomfortable for the occupants to continue staying in. The temperature would increase organically and be matched without the outside temperature. The opposite could occur as well, where the outside temperature is colder and the interior temperature of the vehicle is lowered.

After the temperature is increased, or decreases as explained above, the occupant(s) may be feel uncomfortable and decide to exit the vehicle. Through this, vehicle systems would be shut down when the occupants leave. The additional power by not power the HVAC system would then be directed to the traction battery for charging.

At a period of time after the vehicle starts charging and the occupants have decided to stay in the vehicle, the HVAC system may kick in. As such, the vehicle system may be recognized that the occupants are going to stay in the vehicle regardless of how uncomfortable it is. The dramatic jump at the beginning may be useful such that it would convince the occupants to leave the vehicle at the beginning of the charging whereas near the end of the charging would not make sense. This sequence 700 would also allow some HVAC functionality if the occupant(s) decide to re-enter the vehicle after stepping out of it. In one embodiment, the HVAC function may be actuated at the midway point of charging or earlier than that if it becomes apparent that the occupants are not going to leave the vehicle. Furthermore, if the temperature is above or below a threshold, the HVAC system would be actuated.

Figure 8:
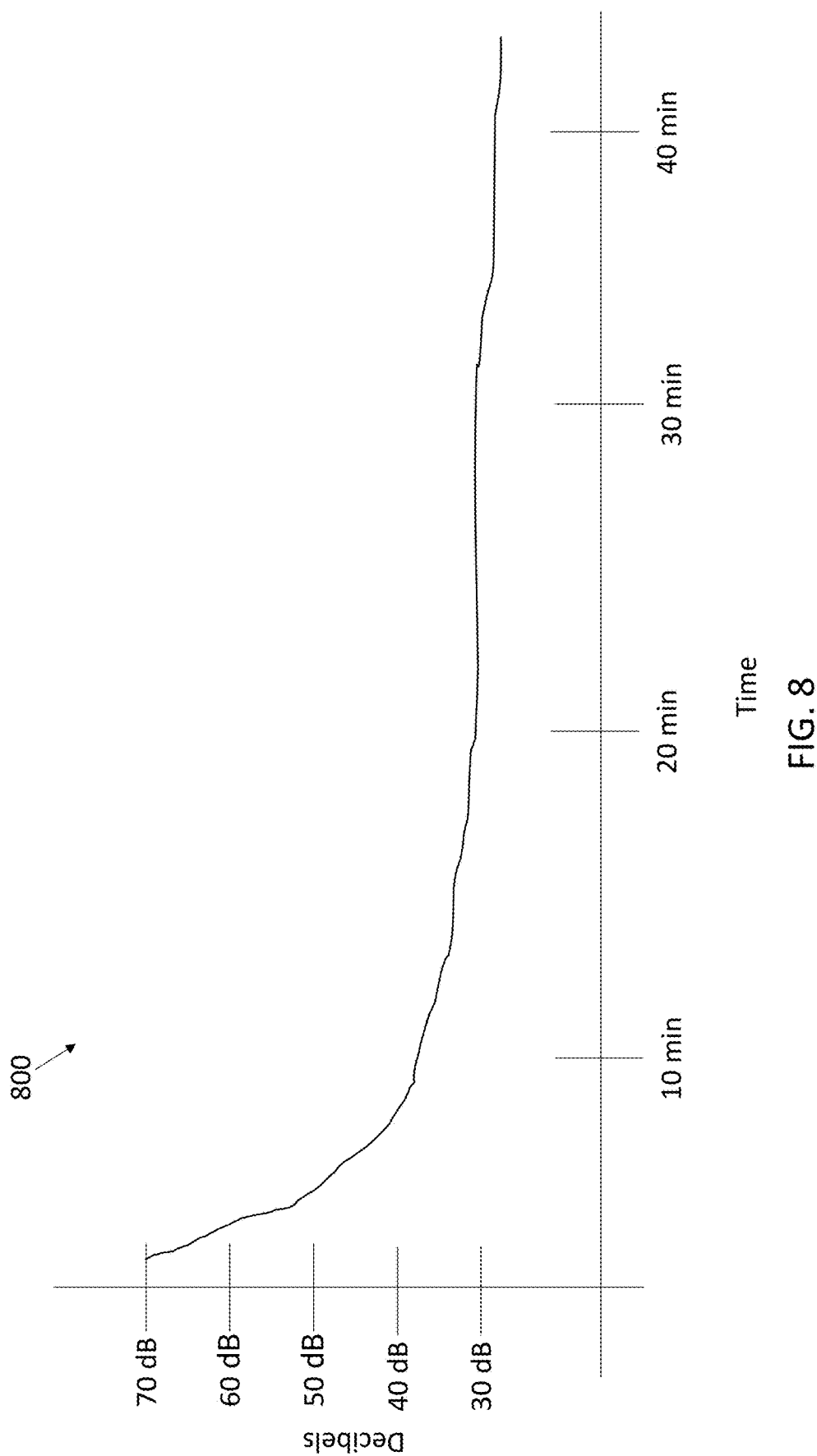
FIG. 8 is a diagram of an illustrative time sequence showing the gradual removal of a sound system such that media options are removed within the vehicle in order to convince the occupant to exit the vehicle in accordance with one aspect of the present disclosure.

FIG. 8 is a diagram of an illustrative time sequence 800 showing the gradual removal of a sound system such that media options are removed within the vehicle in order to convince the occupant to exit the vehicle in accordance with one aspect of the present disclosure. In this sequence 800, the sound within the vehicle is reduced such that the occupants may not want to stay within the vehicle. In one example, the sound for music, video, or gaming device may be reduced.

In the sequence 800, the volume may be reduced rapidly at the beginning, for example, within the first 10 minutes. By doing this, the occupants would find that being in the vehicle is not comfortable and want to leave. The sound may be reduced through vehicle speakers. In one embodiment, the sounds may be lowered in connected devices that are connected with the vehicle. When the occupants leave, the vehicle may shut down all systems allowing the vehicle to charge faster.

The sequence 800 may begin with normal audio at around 70 dBs within the vehicle. Shortly thereafter, the sound may be reduced to more than half within the first 10 minutes. After that, the sound may be slowly reduced. The vehicle system may determine that the occupants intend to stay after a period of time has elapsed. In one embodiment, after a midway point or before that, the sound may be increased to its regular levels since the vehicle system could determine that the occupants intend to stay even if it may take longer to charge the vehicle.

While two sequences were described above individually, they may be combined with one another, or with other functions or features in the vehicle to reduce the amount of power consumed and thus, decreasing the amount of power that is used. For example, the HVAC and sound systems may be modified together making the cabin interior. In another example, the lights may be automatically dimmed within the vehicle forcing the occupants to go elsewhere for appropriate lighting. In one embodiment, scents may be pumped into the vehicle making the interior uncomfortable to be in. Through these mechanisms, the purpose of the reduction in functions within the vehicle is to convince the occupants to leave the vehicle while it is charging such that there is a reduction in time to charge the vehicle.

In one embodiment, if wireless internet is provided by the vehicle, this may be removed gradually or completely. In an example, the download speeds or processing speeds for internet connection would be gradually slowed to frustrate the occupant.

Figure 9:
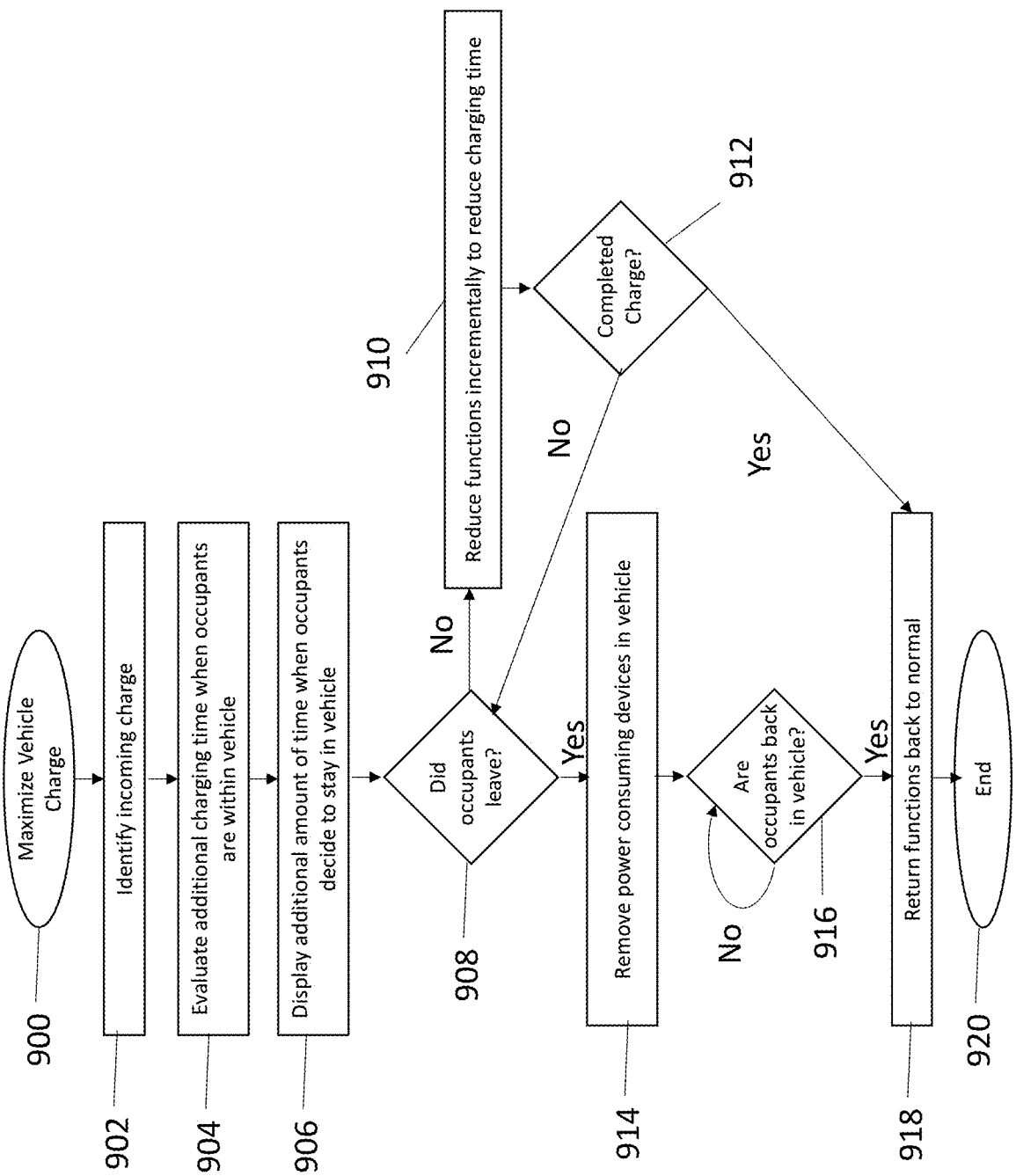
FIG. 9 is a flow diagram showing exemplary processes for maximizing vehicle charge in accordance with one aspect of the present disclosure.

FIG. 9 is a flow diagram showing exemplary processes for maximizing vehicle charge in accordance with one aspect of the present disclosure. Fewer or more processes may be used. These processes may be used to convince the occupants to leave their vehicle such that power is directed to charging the traction battery of the electric vehicle instead of an alternative system used for occupant comfort. The processes may begin at block 900.

At block 902, the vehicle system may be used to identify whether a vehicle is charging. Typically, there are a number of different protocols to determine whether the vehicle is charging and the incoming charge associated with the charge. The charge may vary depending on the various charging modes described above.

At block 904, the vehicle system may evaluate the additional charging time when occupants are within the vehicle. This may depend on the number of occupants and what they are doing. For example, if all the occupants are watching the same display, there is no difference between one occupant and many. If the occupants on the other hand are all using the vehicle's wireless Internet, then the amount of energy being used may be increased based on the number of occupants. The vehicle system may identify and compute the amount of power that is being used. If it is above a threshold, the vehicle system which convinces the user to leave the vehicle may be actuated. For example, small amounts of energy uses would not trigger the reduction of functions. If the power consumption is above a threshold, however, then the vehicle system reducing functions for the occupants may be activated.

An initial warning may be given if the amount of power that is being used for the occupants exceeds a threshold or if the amount of power would affect the charging time. The additional amount of time for charging is displayed when the occupants decide to stay in the vehicle at block 906.

Determination of whether occupants within a vehicle may be performed through a number of different methods. For example, and not limiting hereto, a camera monitoring system may detect motions within the electric vehicle. The camera monitoring system may also detect body heat within the electric vehicle.

A seat sensor may be used to determine whether occupants are within the vehicle. In one illustrative embodiment, the seat sensors may be placed in each of the seats within a vehicle. Weight calibrations may be used. Movement analysis on the seat may also be tracked.

In one embodiment, occupants may be detected through keying functions. For example, when the key is set to accessory mode within the vehicle, the vehicle system may determine that there are occupants within it.

At decision block 908, a determination is made whether the occupants left the vehicle. In this system, if the occupants have not left the vehicle, then the system for reducing functions in the vehicle would be actuated. At block 910, the functions within the vehicle would be reduced or removed. The reduction or removal may be based on the sequences described above. For example, lighting, sound, HVAC functions, and the like may be removed or reduced.

After reducing or removing the functions, at decision block 912, a determination may be made on whether the charge has been completed of the traction battery. This periodic check may be made for a couple of reasons. One reason is that if the occupants are already past a certain point of charging the vehicle, they may have made the decision to already take the extra time to charge the vehicle regardless of the removal of the functions. If not completed, the processes may return to check whether the occupants have left at decision block 908. If the charge has completed, then the process proceed to block 918, which will be described in further detail below. The charge may considered completed once a target state-of-charge (SOC) has been reached or the battery is at 100% SOC.

Returning to decision block 908, and if the occupants have left the vehicle, at block 914, the power consuming devices are turned off or shut down. This may indicate that no one is left in the vehicle and no functions are necessary. By freeing up the power consuming devices, the traction battery may be charged using most, or a larger portion, of the power coming in from the EVSE. This will reduce the amount of time to charge and the purpose for reducing the functions has been advantageously achieved.

At decision block 916, a determination is made on whether the occupants have returned back to the vehicle. If not, a loop is made and the vehicle system will wait for the occupants to return. If the occupants have returned back to the vehicle, then the vehicle system will proceed to block 918 where functions will be returned back to normal. In one embodiment, the functions may be reduced again if the occupant still wishes to charge and sit in their vehicle. The processes may end at block 920.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system for reducing charging time of an electric vehicle, comprising:
    a memory storing one or more instructions; and
    a processor executing one or more of the instructions stored on the memory to perform:
        determining whether an occupant is within the electric vehicle;
        reducing or removing at least one function within the electric vehicle when the electric vehicle is charging and the occupant is within the electric vehicle.

2. The system for reducing charging time of the electric vehicle of claim 1, wherein determining whether the occupant is within the electric vehicle comprises activating an in-vehicle camera monitoring system.

3. The system for reducing charging time of the electric vehicle of claim 2, wherein the camera monitoring system detects motions within the electric vehicle.

4. The system for reducing charging time of the electric vehicle of claim 2, wherein the camera monitoring system detects body heat within the electric vehicle.

5. The system for reducing charging time of the electric vehicle of claim 1, wherein determining whether the occupant is within the electric vehicle comprises monitoring a seat sensor.

6. The system for reducing charging time of the electric vehicle of claim 1, wherein determining whether the occupant is within the electric vehicle comprises monitoring an accessories mode within the electric vehicle.

7. The system for reducing charging time of the electric vehicle of claim 1, wherein reducing or removing the at least one function within the electric vehicle comprises reducing a HVAC system over time.

8. The system for reducing charging time of the electric vehicle of claim 7, wherein the HVAC system is reduced at a greater amount in the beginning.

9. The system for reducing charging time of the electric vehicle of claim 1, wherein reducing or removing the at least one function within the electric vehicle comprises reducing sound for entertainment options over time.

10. The system for reducing charging time of the electric vehicle of claim 9, wherein the sound is reduced at a greater amount in the beginning.

11. The system for reducing charging time of the electric vehicle of claim 1, wherein reducing or removing the at least one function within the electric vehicle comprises removing entertainment options over time.

12. The system for reducing charging time of the electric vehicle of claim 1, wherein the processor executing one or more of the instructions stored on the memory further performs removing all functions when the occupant has left the electric vehicle.

13. A computer program product comprising a non-transitory computer useable storage medium to store a computer readable program that, when executed on a computer, causes the computer to perform operations comprising:
- determining whether an occupant is within the electric vehicle;
- removing functions within the electric vehicle based on time when the electric vehicle is charging and the occupant is within the electric vehicle.

14. The computer program product of claim 13, wherein the computer readable program, when executed on the computer, causes the computer to perform operations to determine whether the electric vehicle is charging.

15. The computer program product of claim 13, wherein removing the functions within the electric vehicle based on time comprises reducing a HVAC system a greater amount in the beginning.

16. The computer program product of claim 13, wherein removing the functions within the electric vehicle based on time comprises reducing sound a greater amount in the beginning.

17. The computer program product of claim 13, wherein the computer readable program, when executed on the computer, causes the computer to perform operations to remove all functions when the occupant has left the electric vehicle.

18. The computer program product of claim 13, wherein the computer readable program, when executed on the computer, causes the computer to perform operations to turn on all functions when the occupant returns to the electric vehicle.

19. An electric vehicle comprising:
- a traction battery;
- a memory storing one or more instructions; and
- a processor executing one or more of the instructions stored on the memory to perform:
  - charging of the traction battery;
  - monitoring whether an occupant is within the electric vehicle;
  - reducing or removing at least one function within the electric vehicle when the occupant is within the electric vehicle.

20. The electric vehicle of claim 19, wherein charging of the traction battery is reduced with actuations of the at least one function.

* * * * *